July 29, 1952  D. H. LOOSLI ET AL  2,604,840
APPARATUS FOR PROTECTING WORKERS AGAINST DUST AND THE LIKE
Filed April 27, 1950  2 SHEETS—SHEET 1
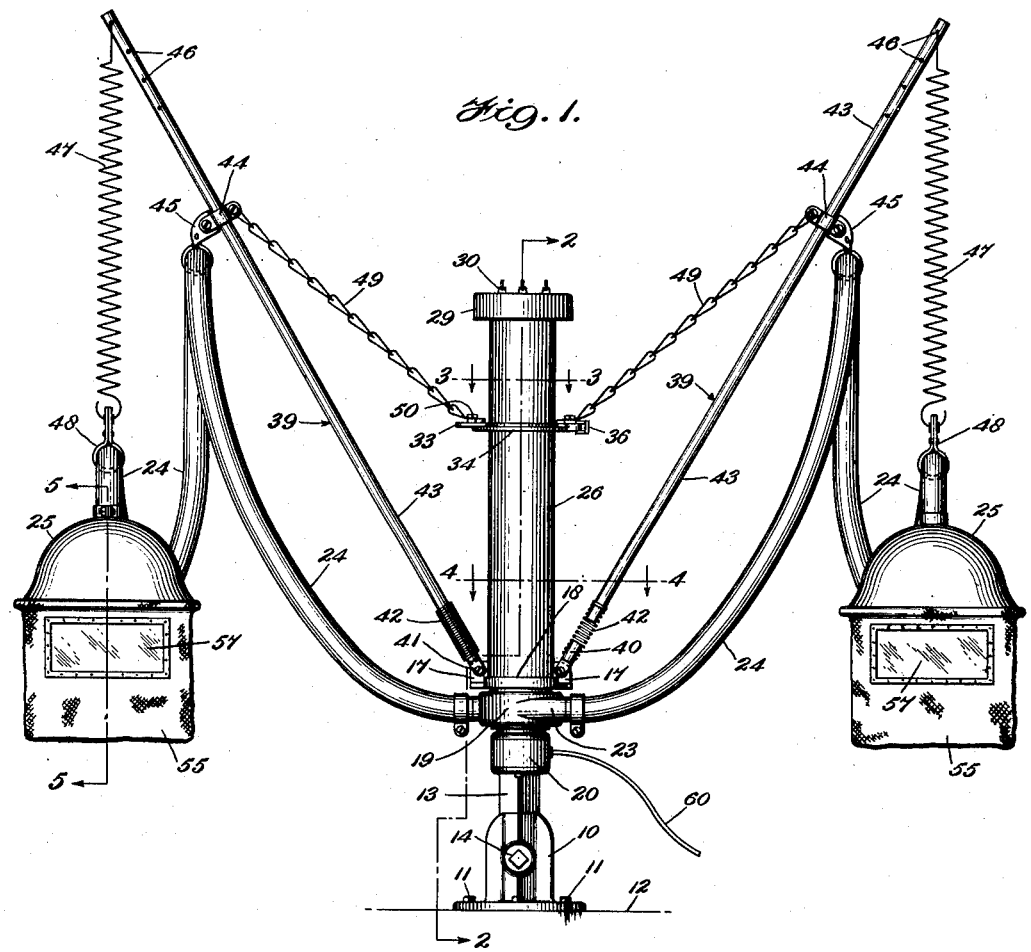
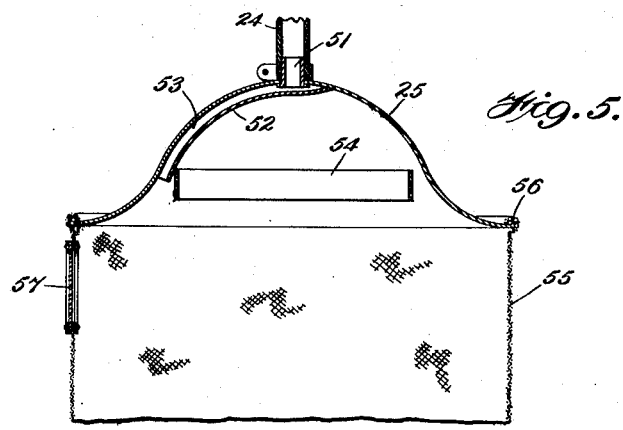
INVENTORS
Dimond H. Loosli and
Donald L. Loosli,
ATTORNEY July 29, 1952 D. H. LOOSLI ET AL 2,604,840
APPARATUS FOR PROTECTING WORKERS AGAINST DUST AND THE LIKE
Filed April 27, 1950 2 SHEETS—SHEET 2
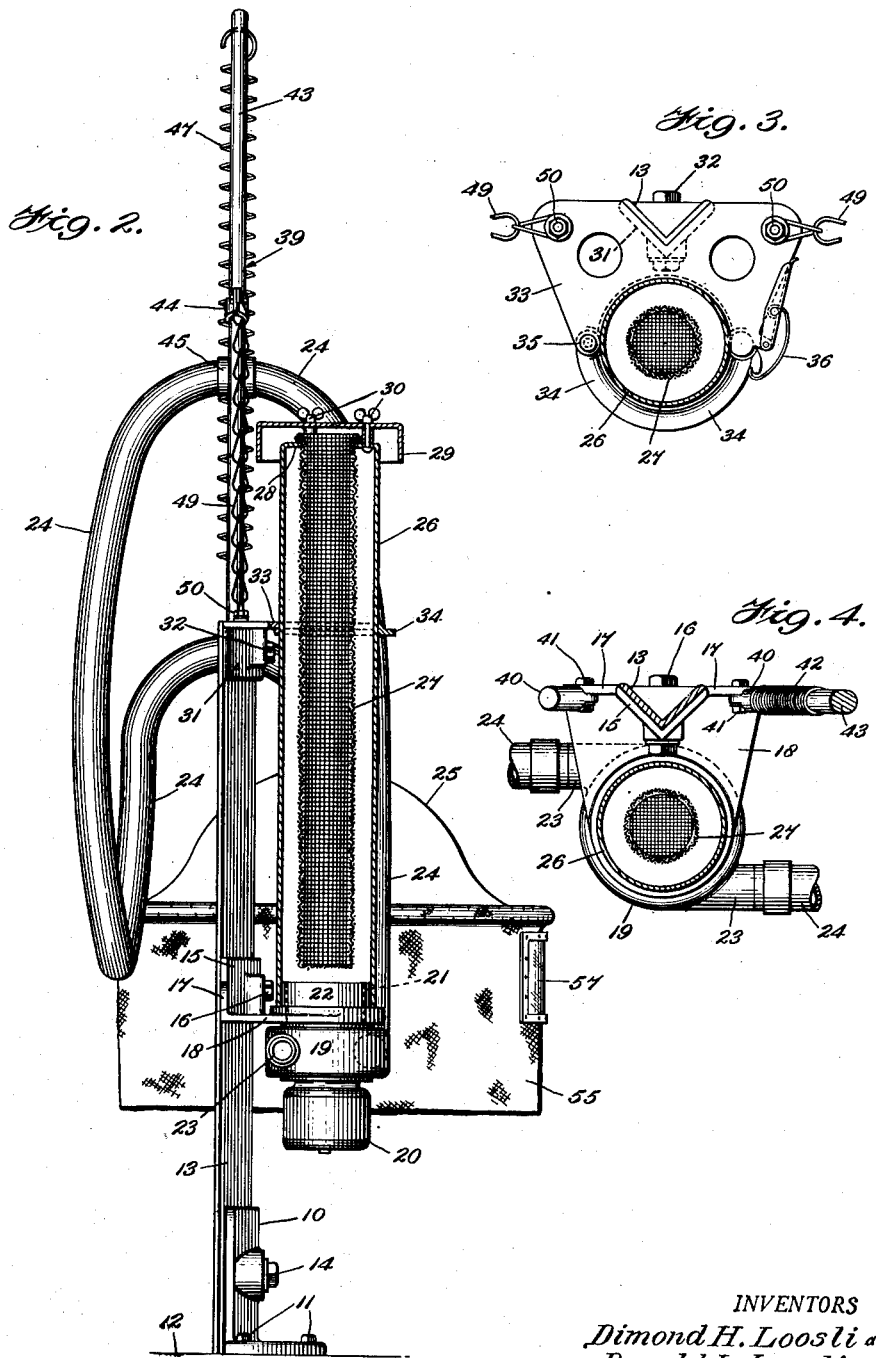
INVENTORS
Dimond H. Loosli and
Donald L. Loosli,
ATTORNEY Patented July 29, 1952

2,604,840

UNITED STATES PATENT OFFICE 2,604,840

APPARATUS FOR PROTECTING WORKERS AGAINST DUST AND THE LIKE

Dimond H. Loosli and Donald L. Loosli, Idaho Falls, Idaho, assignors to D. H. Loosli Co., Inc., Idaho Falls, Idaho, a corporation of Idaho Application April 27, 1950, Serial No. 158,454

6 Claims. (Cl. 98—115)

The invention relates to dust protection apparatus, and has for its principal object the provision of a relatively simple, inexpensive and effective mechanism for protecting workers operating in a highly dust-laden atmosphere against entry of the dust particles into their eyes, ears and nasal and oral passages, as well as substantially eliminating deposit of such particles upon their features and in their hair. While primarily intended for use in operations such as threshing, hay baling, plant or orchard dusting, sand blasting, etc. where the air-carried matter is in the form of dry solids, the apparatus may also be employed to advantage where the airborne matter is liquid, as in paint and insecticide spraying.

Essentially, the apparatus comprises a fan or blower driven by an electric motor and having a suitable filter device connected to its intake. The fan casing has one or more outlets, from each of which a flexible tubing or hose extends to the top of a metallic helmet, from the brim of which depends a fabric mantle or hood, open at the bottom and having a transparent window in its wall through which the wearer may look. In the specific exemplification illustrated in the accompanying drawings forming a part of this specification, the aforementioned elements have associated with them a support arranged to be readily attached to and detached from various machines whereby the apparatus may be easily transferred from one field of operation to another; also, adjustable and yieldable suspension means for carrying the tubings and helmets, whereby the operator is largely relieved of the weight thereof without undue interference with his movements while performing his duties. These, as well as other novel details of construction will be more fully hereinafter described.

In the said drawings, in which like reference characters designate like parts in all the views:

Figure 1 is a front elevational view of one form of apparatus constructed in accordance with the invention;

Fig. 2 is a somewhat enlarged sectional-elevational view of the parts shown in Fig. 1, taken approximately on the planes indicated by the line 2—2 of said figure, looking in the direction of the arrows;

Fig. 3 is an enlarged cross sectional view, on the plane indicated by the line 3—3 of Fig. 1, looking down;

Fig. 4 is a view similar to Fig. 3, but taken on the plane indicated by the line 4—4 of Fig. 1, looking down; and Fig. 5 is an enlarged vertical sectional view through one of the helmets and mantles, taken on the plane indicated by the line 5—5 of Fig. 1, looking in the direction of the arrows.

Referring to the drawings in greater detail, the apparatus as there shown comprises a bracket 10 adapted to be secured by bolts 11 to a support 12, such for example as the frame of a machine adjacent which a person is to perform duties in an atmosphere laden with dust or finely divided particles of liquid. An angle iron 13 is secured to the bracket 10 by a bolt 14, providing an upright standard of suitable length. A bracket 15 is secured by a bolt 16 to an intermediate portion of the standard 13, such bracket having a pair of laterally spaced ears 17 and a horizontal leg 18 to the under side of which is secured the housing of a centrifugal fan or blower 19, the rotor of which is driven by an electric motor 20 secured to and carried by the blower housing. The axially disposed intake of the blower communicates with a passage 21 which extends through the bracket leg 18 and a circular boss 22 provided on the upper face thereof; and the blower housing 19 has one or more (here shown as two) tangential outlets 23 from each of which a flexible tubing or hose 24 extends to the top of a helmet 25.

Seated upon the bracket leg 18 and slidably encircling the boss 22 thereof is the lower end of a vertical pipe 26 constituting a filter casing, within which is disposed a filter element 27 of any suitable construction, here shown as comprising a tube of foraminous material, open at its upper end and closed at its lower end. The said filter element passes through and has its upper end supported by an annular flange 28 with which the upper end of the casing 26 is provided, which flange also supports a readily removable cap 29 normally retained in spaced position thereon by nut and bolt devices 30 (see Fig. 2). Vertical and lateral displacement of the filter assembly is prevented by a bracket 31 secured to the upper end of the standard 13 by a bolt 32 and having a horizontal leg 33 which is provided with a semi-circular clamping member 34 hinged to the leg at 35 and normally retained in clamping engagement with the upper portion of the tube 26 by a toggle-locking latch 36, all as will be clear from Figs. 2 and 3. By releasing the latch 36 and swinging the clamping member 34 on its pivot 35, the filter casing 26 may be lifted from its seat on bracket arm 18 and the filter element 27 withdrawn therefrom for cleaning or replacement.

Each of the ears 17 of bracket 15 mounts an arm 39, comprising a short lower member 40 pivotally attached to the ear by a bolt 41, a helical spring 42 one end of which embraces and is secured to said member 40, and an elongated rod 43, the lower end of which is embraced by and secured to the other end of said spring. The bolts 41 may be tightened to retain the members 40 in any desired angular position between the vertical and the horizontal; and as indicated at the right of Fig. 1, a space is left between the ends of the short member 40 and rod 43 whereby, through the flexible connection provided between these elements by the spring 42, the rod may be swung out of axial alinement with the member, with the spring however, tending to normally maintain such alinement.

Clamps 44 are adjustably secured on the rods 43 and carry straps 45 which encircle and support the tubings 24, as will be readily understood from Figs. 1 and 2. The outer end portions of the rods 43 are provided with a series of apertures 46 which alternatively receive one end of the helical springs 47, the other end of which engages the straps 48 which encircle and support the tubings 24 adjacent the helmets 25, which thus are resiliently suspended from the rods. Chains 49 extend between the clamps 44 and anchor bolts 50 carried by the bracket 31, and permit fore-and-aft swinging of the rods about the resilient connections 42 while at the same time preventing vertical sag of the rods under the weight of the helmets 25 and tubings 24.

As best shown in Fig. 5, the tops of the helmets are provided with a nipple 51 to which the end of the tubing 24 is clamped; and a deflector plate 52 is attached to the crown of the helmet and prevents the incoming current of air from directly striking the head of the wearer, providing a duct or passage 53 extending forwardly from the nipple 51 to the region of the sweatband 54 where it discharges the air in front of the face of the operator. A fabric mantle or hood 55 is secured around the brim 56 of the helmet by an elastic band, draw-string or the like, and its forward wall is provided with a glass, plastic or other transparency 57 through which the wearer may view his surroundings.

In the form shown the apparatus is useful in many agricultural operations, such as harvesting, threshing, hay chopping and baling, etc., where workers perform their duties adjacent machines which create highly dust-charged atmospheres. The device may be readily transferred from one machine to another as occasion may require, and the flexibility of the suspension of the helmets enables the workers to move about sufficiently to perform their duties while at the same time relieving them of much of the weight.

The apparatus also may be readily converted into a portable protector, to be carried on the back of the worker. When so used, the standard 13 is detached from the bracket 10, one of the rods 43 together with the tubing 24 and helmet 25 associated therewith is removed, the outlet duct 23 of the fan which normally supplies such unit is plugged, and the remaining rod 43 adjusted to a substantially vertical position. The apparatus is then placed on the worker's back, with the chains 49 passing over his shoulders to retain it in position, and the helmet placed upon his head. When so equipped the field of the worker's operations is limited only by the length of the electric cable 60 which supplies current to the motor 20.

Of course, if the device is originally constructed as a single unit apparatus, the removal of parts just indicated will not be necessary to adapt it for portable use; and when used as a portable the helmet suspension spring 47 may be removed if desired.

While one form of the invention has been illustrated and described by way of example, it will be obvious that those skilled in the art may vary the details of construction and precise arrangement of parts without departing from the spirit of the invention and therefore it is not wished to be limited to the above disclosure except as may be required by the claims.

What is claimed is:

1. In apparatus of the class described, the combination of a support; a motor driven blower carried by said support, having an intake and a discharge passage; an air filter connected to said intake; a flexible air conduit connected to and extending from said discharge passage; a helmet adapted to be worn by a worker operating adjacent the apparatus, said helmet having a mantle depending therefrom and being connected to said flexible conduit whereby air from said blower may be discharged into the interior of the helmet; and means for supporting said helmet and conduit whereby to in part relieve the worker of the weight thereof, comprising an arm extending from said support and having the helmet and conduit suspended therefrom, said arm having a flexible connection with the support accommodating movements of the arm, helmet and conduit in substantially all directions whereby the worker may move from place to place in the vicinity of the apparatus.

2. In apparatus of the class described, the combination of a support; a motor driven blower carried by said support, having an intake and a discharge passage; an air filter connected to said intake; a flexible air conduit connected to and extending from said discharge passage; a helmet adapted to be worn by a worker operating adjacent the apparatus, said helmet having a mantle depending therefrom and being connected to said flexible conduit for discharge of air from said blower into the interior of the helmet; an arm extending from said support for yieldably suspending said helmet and conduit to in part relieve the worker of the weight thereof, said arm having a resilient connection with the support which accommodates movements of the arm, helmet and conduit in substantially all directions, whereby the worker may move from place to place in the vicinity of the apparatus; means connecting the conduit to said arm; and resilient means suspending the helmet from the arm.

3. Apparatus of the class described, comprising a support; a motor driven blower carried by said support, having an intake and a discharge passage; an air filter connected to said intake; a flexible air conduit connected to said discharge passage; a helmet connected to said conduit for discharge of air from the blower to the interior of the helmet; an arm extending from the support, comprising a pair of axially spaced and alined members having a helical spring embracing their adjacent ends to provide a resilient connection between them normally maintaining such alinement but permitting their misalinement under strain, one of said members being pivotally attached to the support for vertical swinging adjustment of the arm relative thereto; means carried by the arm and engaging a portion of the conduit to support the latter; a helical spring resiliently suspending the helmet from the arm; and connections between the arm and support preventing vertical sag of the arm about its said resilient connection while accommodating horizontal swing about such connection.

4. Apparatus of the class described, comprising a support; a motor driven blower carried by said support, having an intake and a discharge passage; an air filter connected to said intake; a flexible air conduit connected to said discharge passage; a helmet connected to said conduit for discharge of air from the blower to the interior of the helmet; an arm extending from the support and comprising a pair of normally axially alined members having a resilient connection between them tending to maintain such alinement but permitting their misalinement under strain, one of said members being pivotally attached to the support for vertical swinging adjustment relative thereto; a clamp device adjustably mounted on the arm; means carried by said clamp device and engaging a portion of the conduit to support the latter; means yieldably suspending the helmet from the arm; and connections between the clamp device and support preventing vertical sag of the arm about its said resilient connection while accommodating horizontal swing about such connection.

5. Apparatus of the class described, comprising an upright standard; a bracket secured to said standard; a motor driven blower carried by said bracket, having an intake and a discharge passage; a tubular filter casing removably mounted on said bracket and communicating with said blower intake; an air-filter element in said casing; a second bracket secured to the standard in longitudinally spaced relation to the first mentioned bracket and having a clamping member engageable with the filter casing whereby to prevent displacement of the latter from said first bracket; a flexible air conduit connected to the discharge passage of the blower; and a helmet connected to said conduit for discharge of air from the blower to the interior of the helmet.

6. Apparatus of the class described, comprising an upright standard; a bracket secured to said standard; a motor driven blower carried by said bracket, having an intake and a discharge passage; a tubular filter casing removably mounted on said bracket and communicating with said blower intake; an air-filter element in said casing; a second bracket secured to the standard above the first mentioned bracket and having a pivoted member engageable with the filter casing; connections between the second bracket and its said pivoted member for drawing the latter into and maintaining it in clamping engagement with the filter casing, whereby to prevent displacement of the latter from the first bracket; a flexible air conduit connected to the discharge passage of the blower; and a helmet connected to said conduit for discharge of air from the blower to the interior of the helmet.

DIMOND H. LOOSLI.
DONALD L. LOOSLI.

REFERENCES CITED

The following references are of record in the file of this patent:

UNITED STATES PATENTS

| Number | Name | Date |
| --- | --- | --- |
| 1,841,347 | Tuttle | Jan. 12, 1932 |
| 2,096,262 | Roth | Oct. 19, 1937 |
| 2,436,508 | Fairbanks | Feb. 24, 1948 |
| 2,478,498 | Myers | Aug. 9, 1949 |